United States Patent

[11] 3,629,754

[72] Inventors Dieter Sobottka
Jever, I. O.;
Dieter Folkens, Wilhelmshaven,
both of Germany

[21] Appl. No. 22,185
[22] Filed Mar. 24, 1970
[45] Patented Dec. 21, 1971
[73] Assignee Olympia Werke AG
Wilhelmshaven, Germany

[54] MAGNETICALLY ACTUATED COUPLING
11 Claims, 5 Drawing Figs.

[52] U.S. Cl. .......... 335/253, 335/254, 335/274
[51] Int. Cl. .......... H01f 7/08
[50] Field of Search .......... 335/74, 253, 274, 233, 265, 232, 242, 263, 251, 252, 253, 254; 310/25, 32, 33

[56] References Cited

UNITED STATES PATENTS

| | | | |
|---|---|---|---|
| 1,807,381 | 5/1931 | Butler | 335/167 X |
| 2,982,834 | 5/1961 | Edmunds | 337/6 |
| 3,320,559 | 5/1967 | Morrison | 335/151 |
| 2,487,052 | 11/1949 | Hastings | 335/151 X |
| 3,059,074 | 10/1962 | Dal Bianco et al. | 335/154 |
| 2,870,287 | 1/1959 | Corbitt et al. | 335/151 |
| 3,032,628 | 5/1962 | Ellwood | 335/154 |

FOREIGN PATENTS

| | | | |
|---|---|---|---|
| 844,337 | 8/1960 | Great Britain | 335/253 |

*Primary Examiner*—G. Harris
*Attorney*—Spencer & Kaye

ABSTRACT: A magnetically actuated coupling for transmitting linear forces and composed of a pair of coupling elements arranged in a magnetic field, which is preferably produced by an electromagnet having a hollow core in which the coupling elements are arranged. The coupling elements are constructed of a magnetizable material, so that they will be drawn together at the axis of the core of the electromagnet when power is provided to the coil of the electromagnet, and released when the power to the electromagnet is terminated. At least one of the coupling elements is resiliently mounted, so that it will move out of contact with the other element when the electromagnetic field collapses.

16
2
6
4
5
8
13
11
10
12
9
7
3
17

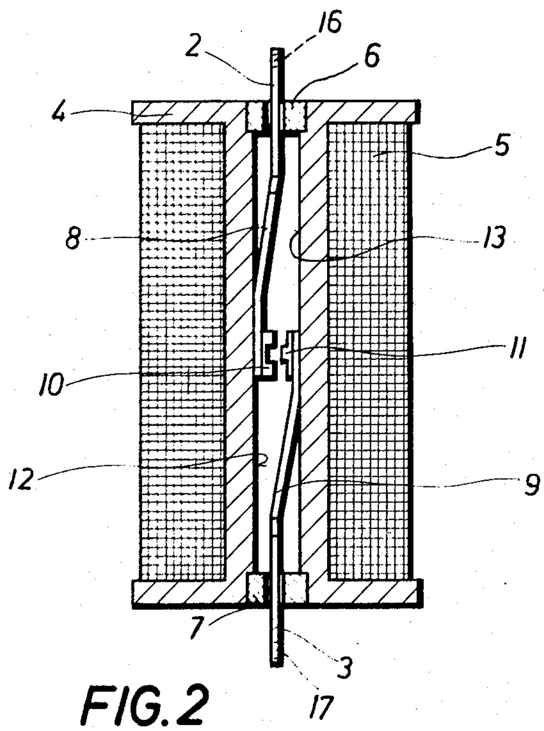
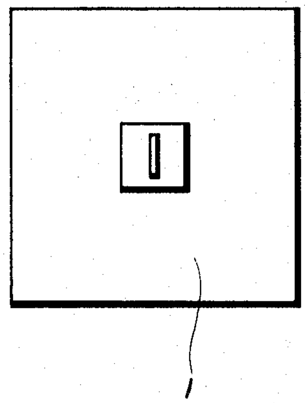
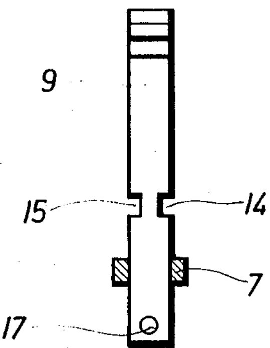
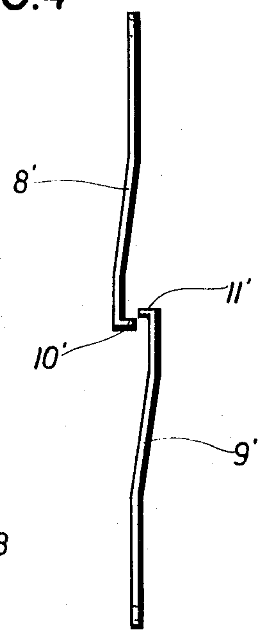
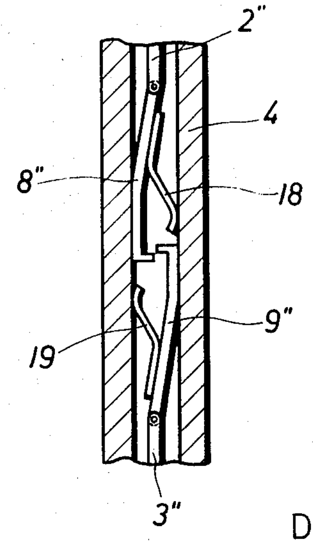
INVENTORS.
Dieter Sobottka
Dieter Folkens
BY Spencer & Kaye
ATTORNEYS.

MAGNETICALLY ACTUATED COUPLING

BACKGROUND OF THE INVENTION

The present invention relates to a magnetically actuatable coupling having two coupling, or clutch, portions movable against one another to transmit pulling or pushing forces, particularly for fast switching processes in precision mechanical applications.

Magnetically controllable switching couplings for form-fitting transmission of torques are already well known. Such couplings, or clutches, are used where ever immediate and slip-free torque transmission is important.

SUMMARY OF THE INVENTION

It is an object of the present invention to provide an improved highly responsive and effective coupling for the transmission of pulling or pushing forces, whose construction is particularly suitable and which is particularly simple to manufacture.

This object is accomplished according to the present invention in that the coupling portions are designed to be form-fittingly cooperative in the direction of force, and that at least one of the coupling parts consists of a magnetizable material through which a magnetic field can be actuated and which is resettable by the force of a spring when the magnetic field is removed.

In an advantageous embodiment of the present invention the coupling part is provided with a switching tongue of a resilient, magnetizable material at the end of which there is disposed a coupling jaw. This coupling jaw may be constructed according to the present invention so that either tension or compression forces can be transmitted only in one direction, or so that tension and compression forces can be transmitted in both directions. Due to the small number of components to be moved, the switching time can be held extremely short. A short switching time is desirable, for example, for rapid setting of coding pushers in typewriters and similar office machines.

A further object of the present invention is achieved in that the coupling part, the switching tongue and the coupling jaw are made of one piece. Thus, there are provided coupling parts having a very small mass, so that high setting speeds can b obtained. The manufacturing costs are also low, since these components can be manufactured in one operating step.

A further advantageous embodiment of the present invention consists in that the switching tongue of the coupling part is disposed within the region enclosed by the magnetic coil and is provided with a reduction in its cross-sectional area near a retaining guide sleeve. This reduction is preferably in the form of a recess about which the switching tongue can pivot under the influence of the magnetic field. This produces a defined point about which the switching tongue can oscillate.

BRIEF DESCRIPTION OF THE DRAWINGS

FIG. 1 is a side elevation view, partly in cross section, of an embodiment of a coupling according to the present invention.

FIG. 2 is a top plan view of the coupling of FIG. 1.

FIG. 3 is a front elevation view showing a second embodiment of a coupling part.

FIG. 4 is a side elevation view showing a second embodiment of the coupling parts.

FIG. 5 is a side elevation view showing a third embodiment of the coupling parts.

DESCRIPTION OF THE PREFERRED EMBODIMENTS

As can be seen in FIGS. 1 and 2, the coupling substantially consists of a magnetic coil 1 in which two coupling portions, or members 2 and 3 are mounted and guided to be longitudinally movable in a hollow core defined by a supporting member, or coil body 4. The magnetic coil 1 consists of the coil body 4 and the insulated winding 5. Two guide sleeves 6 and 7 for the members 2 and 3 are disposed in the coil body 4. The coil body 4 and the guide sleeves 6 and 7 are preferably made of a suitable resistant and electrical conductible synthetic resins of the acetal plastic group, more particularly, a synthetic resin such as is sold by "Du Pont" under the trademark "Delrin."

The coupling members 2 and 3 each consist of a resilient and magnetizable material, such as spring steel, and are provided with switching tongues 8 and 9 on which mating coupling jaws 10 and 11 are mounted. These switching tongues 8 and 9 are biased in such a manner that they rest against the inner walls 12 and 13 of the coil body 4 under slight tension. At the opposite end of parts 2 and 3 from sleeves 6 and 7 the switching tongues 8 and 9, together with the coupling jaws 10 and 11, are arranged in the center of the magnetic coil 1 to be opposite one another and a slight distance apart.

The coupling parts 2 or 3 with the switching tongues 8 and 9 could consist of a nonresilient, known magnetic material, such as a mild steel or soft iron.

Furthermore the coupling members 2 and 3 with tongues 8 and 9 could consist of a resilient and nonmagnetizable material and the jaws 10 and 11 could consist of magnetic material, such as soft iron. As shown in FIG. 3, the switching tongues 8 and 9 may be provided with a reduction of their cross-sectional area in the form of recesses 14 and 15 in the vicinity of the guide sleeves 6 and 7. This reduced cross section defines a point about which the switching tongue 8 or 9, may oscillate or pivot.

Moreover, coupling parts 2 and 3 (FIG. 1) are provided with suspension holes 16 nd 17 which can be connected to other elements. The pushing or pulling movements can be initiated, or transmitted, by this means.

FIG. 4 shows a further embodiment of the clutch parts 2 and 3. Here the coupling jaws 10′ and 11′ provided at the ends of switching tongues 8′ and 9′ are constructed to form angled hooks. These are unidirectional jaws, acting to transmit only tension or pulling, forces.

The present invention is not limited to the embodiment described above, but can be modified by appropriately changing the individual features. For example, one of the coupling members 2, 3 (FIG. 1) may consist of nonresilient, magnetizable material which does not move laterally and which is guided to be only longitudinally movable in its guide sleeve 6 or 7.

On the other hand, a permanent magnet could also be used to switch the coupling instead of the magnetic coil.

FIG. 5 shows a further embodiment of the coupling part 2″ and 3″. Here the coupling parts 2″ and 3″ are pivotally connected with switching tongues 8″ and 9″ of magnetizable material. These tongues 8″ and 9″ are connected with springs 18 and 19 which bias the tongues toward their predetermined positions.

The operation of the coupling according to the present invention is as follows:

If a voltage is applied to the terminals of the magnetic coil 1 a magnetic field is formed which extends axially through the region enclosed by the winding and the switching tongues 8 and 9 and the jaws 10, 11, are magnetized with opposite polarity with respect to one another so that they attract one another.

When the tongues 8 and 9 consist of nonmagnetizable material only the switching jaws 10, 11 are magnetized with opposite polarity with respect to one another so that they attract one another.

When the tongues 8 and 9 consist of nonmagnetizable material only the switching jaws 10, 11 are magnetized with opposite polarity with respect to one another so that they attract one another.

On the other hand the jaws could consist of nonmagnetizable material and the tongues 8 and 9 are only magnetized with opposite polarity. The coupling is, thus, closed and a linear traction movement imparted to one coupling part is positively transmitted to the other coupling part. After completion of the transmission of movement and disconnection of the excitation voltage, the magnetic field collapses and the coupling opens again due to the resetting force of the resilient switching tongues 8 and 9. The movement may, of course, be the result of either a linear pulling or pushing force.

Such couplings with coupling jaws according to FIG. 1, however, can only be switched on when in their rest position, and only in a quite definite mutual relationship of coupling parts 2 and 3. When the coupling jaws are constructed as shown in FIG. 4, the coupling can still be closed during a pulling movement of one of the parts 2 or 3, as long as the initial position of the 1 0′ and 11′ of parts 2 and 3 are in an overlapping relationship.

The particular advantage of the present invention, is however, that only a few components having a small mass are required to close the coupling, so that extremely short switching times are possible.

It will be understood that the above description of the present invention is susceptible to various modifications, changes and adaptations, and the same are intended to be comprehended within the meaning and range of the equivalents of the appended claims.

We claim:

1. A magnetically actuable coupling for transmitting forces comprising, in combination:

a. means for producing a magnetic field;

b. a first coupling member at least a portion of which is magnetizable and having coupling means arranged within the magnetic field, said first member mounted for movement in a predetermined direction with respect to said means for producing a magnetic field and biased toward a predetermined position; and c. a second coupling member mounted for movement in said predetermined direction with respect to said means for producing a magnetic field, and having coupling means arranged in the magnetic field adjacent to the coupling means of said first member and positioned transverse to said first member coupling means with respect to the predetermined direction and the direction of the magnetic field for moving toward, and mating with, the coupling means of said first coupling member, so that the coupling means of said first and second members engage each other for transmitting forces along said predetermined direction when the magnetic field is being produced and disengaged from each other due to the biasing of said first member when the magnetic field is not being produced, thereby to terminate the transmission of forces between said first and second members in said predetermined direction.

2. A coupling as defined in claim 1, wherein said means for producing a magnetic field is a magnetic coil having a supporting member defining a hollow core whose longitudinal axis is in said predetermined direction, and wherein said first and second members are mounted and guided for longitudinal movement in the follow core and arranged so that said coupling means of said first member is disposed to lie opposite of and spaced apart from said coupling means of said second member.

3. A coupling as defined in claim 2, wherein said first member and said second member are each constructed as a separate single element, and said coupling means are each portions of a respective one of said single elements.

4. A coupling as defined in claim 3, wherein said first member has a switching tongue constructed of a resilient, magnetizable material rigidly connected to said coupling means.

5. A coupling as defined in claim 4, wherein said switching tongue of said first member defines recesses which reduce the cross-sectional area of said switching tongue, the recesses being arranged substantially adjacent said mounting means so as to produce a defined point around which said switching tongue can move to engage and disengage the coupling means of said second member.

6. A coupling as defined in claim 5, wherein said coupling means engage only for transmitting tension forces.

7. A coupling as defined in claim 5, wherein said coupling means cooperate for the transmission of both tension and compressive forces.

8. A coupling as defined in claim 5, wherein said second member is constructed of a nonresilient magnetizable material.

9. A coupling as defined in claim 5, wherein said second member is constructed of a resilient, magnetizable material and has a switching tongue.

10. A coupling as defined in claim 3, wherein said first member is constructed of a resilient, nonmagnetic material and has a soft iron plate mounted thereon.

11. A coupling as defined in claim 3, wherein said first member is constructed of a magnetizable material and is pivotally connected to an actuating member, and further including spring means to bias said first member toward its predetermined position.

* * * * *